E. C. BECHT.
BEATING AND AERATING PROCESS AND APPARATUS.
APPLICATION FILED NOV. 7, 1918.
1,309,175. Patented July 8, 1919.
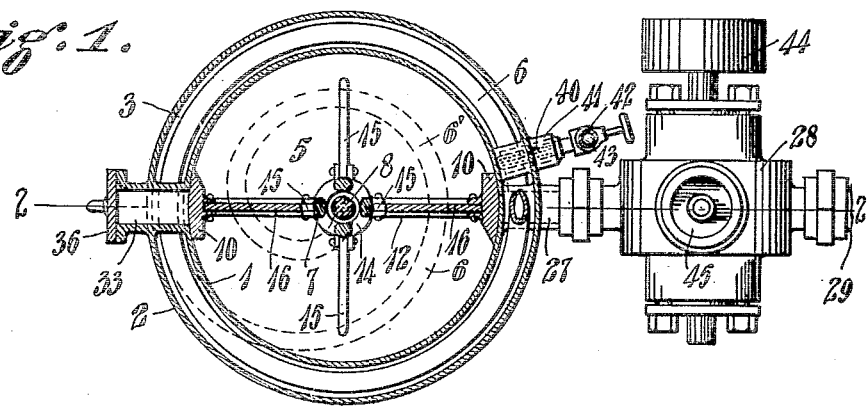
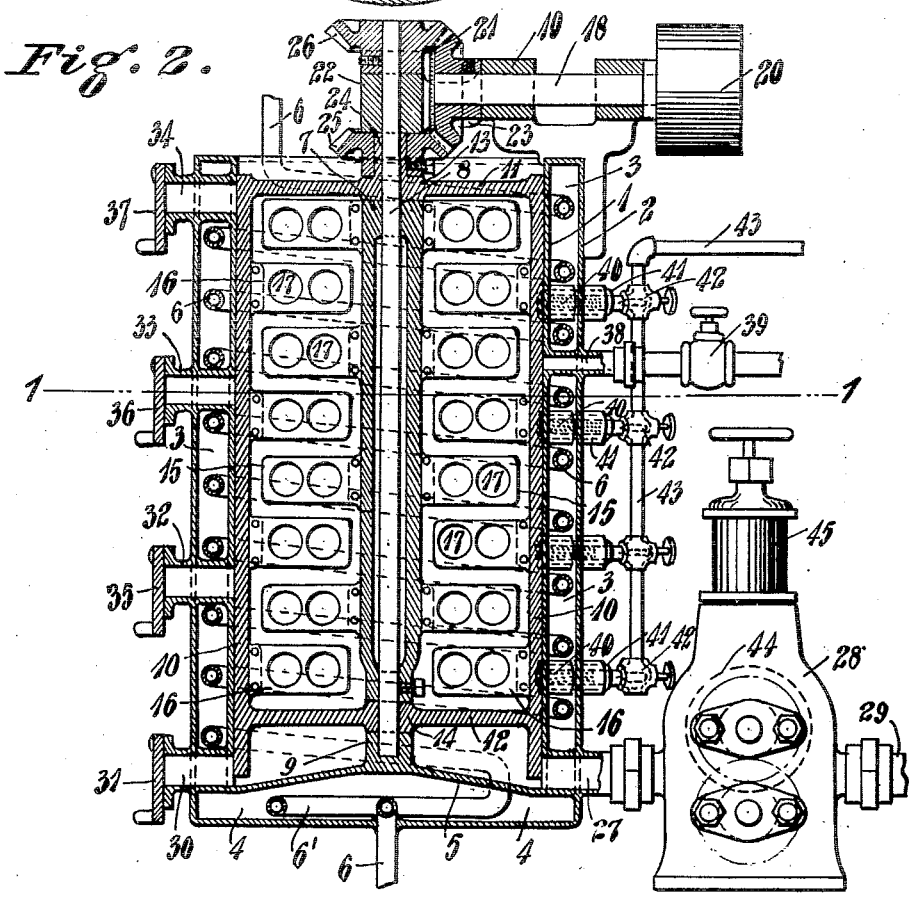
Witnesses:
Clarence Perdew
Irene Parker
Inventor
Edward C. Becht
By James N. Ramsey
Attorney.

UNITED STATES PATENT OFFICE.

EDWARD C. BECHT, OF NEWPORT, KENTUCKY.

BEATING AND AERATING PROCESS AND APPARATUS.

1,309,175. Specification of Letters Patent. Patented July 8, 1919.

Application filed November 7, 1918. Serial No. 261,512.

*To all whom it may concern:*

Be it known that I, EDWARD C. BECHT, a citizen of the United States, and a resident of Newport, in the county of Campbell and State of Kentucky, have invented certain new and useful Improvements in Beating and Aerating Processes and Apparatus, of which the following is a specification.

My invention relates to bread, pastry and confection making, and its object is to more efficiently and economically produce such articles of confectionery and pastry as marshmallow and other fillings or toppings. My invention is also applicable to the production of ice cream and similar products; in fact, to the production of any substance which it is desired shall have a highly comminuted and aerated consistency.

My invention consists in the novel method and in the apparatus for carrying out said method and in the combination of parts and the details of construction and arrangement of parts of said apparatus as will hereinafter be more fully described and claimed.

In the drawing:

Figure 1 is a horizontal cross-section on a plane corresponding to the line 1—1 of Fig. 2; and Fig. 2 is a vertical cross-section on a plane corresponding to the line 2—2 of Fig. 1.

In the production of substances of the character just mentioned, it is the usual practice to introduce the ingredients into a vessel and agitate or beat them more or less violently while subjected to heat or cold, as the requirements may be; keeping up this treatment until the substance has been found to have reached the right consistency both as regards thoroughness of admixture and degree of aeration. The body of substance is then removed from the vessel in which it was treated and is put to the use for which it is intended; after which a new lot of the ingredients are placed in the vessel, if a further quantity of the substance is to be prepared.

In this method the admission of air to the body of substance while it is being agitated, usually is through the top of the body of substance only incident to contact with the air at the surface as different portions of the surface are exposed during the agitation.

According to my improved method, I provide a mixing, beating and aerating vessel into which I introduce the partially mixed ingredients of the intended substance at or near the bottom, and also permit a substantial proportion of air to enter with the substance. In this vessel to which the substance is thus admitted in a lower part of the mixing, beating and aerating space, I suitably agitate the substance along with the air that has been admitted with it; at the same time preferably leaving the surface of the body of substance exposed to the air so that it also takes in such volumes of air as it may at the surface. I proceed upon the theory that as the substance and air are agitated together and the substance is more thoroughly comminuted and the number of air spaces inclosed in it are increased, both in number and capacity, and thus more air enters into the makeup of the body, the specific gravity of the substance decreases. This being the case, that substance which first enters the lower part of the agitating and aerating space travels upward under the action of the less agitated and aerated and consequently more dense substance just entering. Depending upon this action, I provide for permitting the agitated and aerated substance to escape at a greater or less distance from the top of the agitating and aerating space.

The process is therefore a continuous one, a pump preferably being employed to force the partially mixed ingredients into the lower part of the agitating and aerating space so that if an outlet for the substance is provided at any higher level in the apparatus, the substance that has reached that level may escape continuously under the action of the continuous inflow from the pump; and this substance escaping at this level will have a heavier or a lighter consistency, depending very closely upon the height at which the substance has been allowed to escape.

Suitable means may be provided for keeping the agitating and aerating space at the desired temperature, whether this be a high temperature in the preparation of marshmallow and similar products, or whether it be a very low temperature as in the preparation of ice cream and other preparations of that character.

It will be seen that this continuous flow of the substance through the agitating and aerating space is a far more economical operation than the filling and emptying of the agitating and aerating space each time the substance to the amount of capacity of the space is to be prepared, as in former practice. Also, since the rate of inflow may be very accurately governed by regulating the pump or other means by which the inflow is induced; and since the rate of agitation may be very accurately governed, the outlet of the substance at any given height will insure a uniformity of consistency that could be obtained under the fragmentary process just mentioned only by the exercise of the greatest amount of care by a very skilled operator. In the apparatus which I prefer, I provide two or more outlets at different heights in the operating space so that different consistencies may be established on this principle. Intermediate gradations of consistency may be attained by varying the rate of inflow or the rate of agitation, or both.

It may frequently happen that in the beginning of the continuous operation, according to my method, the substance has not been introduced at the proper temperature or in the proper degree of fluidity, or some other fault may have arisen in the preparation of the substance or the operation of the apparatus. In order to compensate for initial discrepancies, I prefer to provide for admitting water or other suitable liquid into the substance in the agitating and aerating space at such time as may be required to vary the consistency of the substance.

As an example of improved apparatus for carrying out the method just described, I illustrate herein an upright cylindrical inner vessel 1 surrounded by the cylindrical outer vessel 2 at the sides and bottom so that an annular space 3 is left around the sides of the inner vessel 1 and a space 4 under the bottom 5 thereof. As here shown, a pipe 6 leads up through the bottom of the vessel and passes in a spiral 6' to the bottom of the annular space 3 up through which it passes repeatedly around the inner vessel 1 in the form of a helix; passing up out of the space 2 at the top thereof.

The interior of the vessel 1 is the agitating and aerating space.

The agitating means comprises the upright frame 7 surrounding the upright shaft 8 in the center of the vessel; this shaft 8 having a step bearing 9 fixed to the bottom of the vessel. There is also, preferably, the outer frame comprising the scrapers 10 that have sharp edges bearing against the side wall of the vessel and are mounted on upper and lower arms 11 and 12 radiating from hubs 13 and 14, respectively, that turn loosely on the shaft 8 above and below the frame 7 at the top and bottom of the vessel, respectively.

The frame 7 has the radiating wings or paddles 15 at suitable intervals from top to bottom thereof; and the scrapers 10 have the radially inwardly extending blades or paddles 16 in the spaces between those through which pass the paddles 15. The paddles 15 and 16 preferably have large perforations 17 in them and the adjacent paddles are preferably spaced some distance apart, the size of these perforations and the spacing of the paddles depending somewhat upon the violence of agitation desired with any given speed of rotation of the elements.

It is the purpose to rotate these two elements in opposite directions. This is done by means of a horizontal driving shaft 18 journaled in a bracket 19 fixed on one side of the top of the vessel and having a pulley 20 which may be belted to any suitable motive apparatus. This shaft 18 carries a bevel gear 21 near the middle of the vessel, and the bracket 19 has the bearing 22 supported by arms 23 that flank the bevel gear 21; this bearing 22 supporting the upper end part of the central shaft 8 which projects up out of the vessel 1. The hub 13 has a reduced part 24 projecting up under the bearing 22, which has secured to it the bevel gear 25 meshing with the bevel gear 21; while above the bearing 22 the central shaft 8 projects up and has fastened on it the bevel gear 26 also meshing with the bevel gear 21. Since these gears 25 and 26 mesh with the gear 21 at opposite sides, the one set of blades or paddles 15 will be rotated in one direction along with the upper gear 26 and shaft 8, and the other set of blades 16 will be rotated in the opposite direction along with the lower gear 25 and hub 13. The scrapers 10 serve to prevent sticking of the treated substance to the sides of the vessel, as is well known in apparatus of this character.

In fact, the entire apparatus so far described is not considered by me to be particularly novel; and it will be understood that any other approved means for containing a substance under the efficient action of heat or cold, as the case may be, and the effective agitation thereof therein, is adapted for the carrying out of my process and is comprehended by my invention in so far as it will make up part of the elements in conjunction with other elements of the apparatus which will now be described.

The inlet pipe 27 leads in through the side wall of the outer vessel 2 and the side wall of the inner vessel 1 next to the bottom of the inner vessel. This pipe 27 leads from a suitable pump 28; here shown as a rotary pump which, it will be understood, takes the supply of substance from the kettle or other source through the pipe 29.

At the other side of the vessels is a drain outlet pipe 30 leading through the walls of both vessels next to the bottom of the inner vessel like the inlet pipe 27 does. This drain pipe 30 has at its outer end a gate 31 by which it may be opened or closed.

At suitable intervals up along the side walls of the vessels are the outlet pipes 32, 33 and 34 leading through the walls of the two vessels as does the drain outlet 30, and having at their outer ends the gates 35, 36 and 37, respectively. The uppermost outlet pipe 34 is very close to the top of the apparatus; and the other two, as here shown, are located at uniform intervals between the uppermost one and the drain outlet 30 at the bottom.

At the other side of the vessels, preferably somewhat above the middle thereof, is the liquid inlet pipe 38 controlled by a valve 39; this pipe leading through the walls of the two vessels as do the other pipes.

For admitting air in addition to that taken in with the substance, the perforated nozzles 40 enter the chambers 41 communicating with the interior of the inner vessel 1 through the space at various heights, and supplied, under the control of individual valves 42, through a pipe 43 that may lead from any suitable source of air under pressure.

It will be understood that these walls where the pipes lead through them are made suitably tight around the pipes. This is not especially important with reference to the outer wall where the coiled pipe 6 is used, in which case the outer wall or vessel 2 serves principally as an insulating means to increase the efficiency of the heating or cooling medium contained in the pipe 6. However, it will be understood that the pipe 6 may be dispensed with and the heating or cooling medium introduced into the space inside the outer vessel around the sides and bottom of the inner vessel. For instance, where heating is required, water at a suitable temperature may be introduced either into the pipe 6 or directly into the space as just mentioned; or where cooling is to be done, the medium may be a suitably cooled brine.

The rate of inflow of the substance to be treated may be readily governed either by varying the actual speed of operation of the pump 28 as driven by its pulley 44, or by manipulating its pressure regulating means 45. It will be understood that the blades or paddles 15 and 16 may be rotated more rapidly or more slowly as may be required. If the substance is introduced slowly by the pump and these paddles rotated rapidly, the substance will have a more highly comminuted and aerated consistency if withdrawn through any given one of the outlets 32, 33 or 34. The more rapidly the pump is operated in proportion to the speed of the agitator blades 15 and 16, the heavier will be the consistency of the substance as withdrawn at any given level.

Should it be found upon starting the operation that with a given rate of inflow and speed of agitation the substance is too heavy as withdrawn at a given outlet, water or other desired liquid may be admitted through the pipe 38 by opening the valve 39; this being in accordance with the method as hereinbefore described. It will also be understood that the heating or cooling operation may be controlled by any suitable well-known means in conjunction with the coiled pipe 6, or, where this is dispensed with, in conjunction with the spaces here shown as containing this pipe. The temperature at which the operation is performed, of course, is one of the factors influencing the consistency of the substance withdrawn at any given height in connection with any given rate of inlet and agitation and aeration.

The amount of air forced in with the substance by means of the pump 28 or equivalent means is largely dependent upon the nature of the source from which the substance is withdrawn. The admission of some air or vapor with the substance, if it is withdrawn from an open kettle or other container, is practically unavoidable; and the pump or equivalent forcing means will be found in some cases to introduce an ample volume of air along with the substance to accomplish the purpose of my invention in conjunction with the usual intake of air at the surface of the substance, without the use of the special air supply nozzles 40 or similar means.

If the pump 28 withdraws the substance from an open container, there will be available all of the exposed surface of the substance in this container in addition to all of that in the agitating space for the effective inlet of air to the body of substance during the agitating operation. The conditions for thorough agitation and aeration are thus decidedly more favorable than in ordinary processes where the substance is merely poured into a vessel and beaten therein without any provision for inlet of any substance or air below the surface.

While certain constructional details are deemed preferable in connection with my invention, and I have shown and described these rather specifically in elucidating the construction and use of my invention, as is required, I do not wish to be understood as being limited to such precise showing and description, but having thus fully described my invention, what I claim as new and desire to secure by Letters Patent is:

1. The method of treating a substance to alter its consistency, substantially without segregating any of its constituents, which consists in beating and aerating said substance by continuously passing said substance into a space in which suitable agitating means is operating, and allowing said substance to continuously escape from said space in its beaten and aerated but undivided condition.

2. The method of treating a substance to alter its consistency substantially without segregating any of its constituents, which consists in beating and aerating said substance by continuously passing said substance into a lower part of a space in which suitable agitating means is operating, and allowing said substance to continuously escape from an upper part of said space in its beaten and aerated but undivided condition.

3. The method of treating a substance to alter its consistency, substantially without segregating any of its constituents, which consists in beating and aerating said substance by continuously passing said substance into a space in which suitable agitating means is operating, suitably controlling the temperature of said space while said substance is in said space, and allowing said substance to continuously escape from said space in its beaten and aerated but undivided condition.

4. The method of treating a substance to alter its consistency substantially without segregating any of its constituents, which consists in beating and aerating said substance by continuously passing said substance into a lower part of a space in which suitable agitating means is operating, suitably controlling the temperature of said space while said substance is in said space, and allowing said substance to continuously escape from an upper part of said space in its beaten and aerated but undivided condition.

5. In beating and aerating apparatus, a vessel, agitating means in said vessel, means for operating said agitating means, an inlet into the lower part of said vessel for substance to be treated therein, a plurality of outlets for said substance at various heights in said vessel above said inlet, and means for closing each one of said outlets whereby said outlets are adapted to be used alternatively, so that each outlet may be used to the exclusion of use of any other one of the outlets simultaneously.

6. In beating and aerating apparatus, a vessel, agitating means in said vessel, means for operating said agitating means, an inlet into the lower part of said vessel for substance to be treated therein, an outlet for said substance in a part of said vessel above said outlet, said vessel comprising means for preventing the escape of substance at any point below said outlet while said substance is escaping from said outlet, a liquid inlet in said vessel above said inlet for the substance, and a plurality of air inlets at various heights in said vessel above said substance inlet.

7. In beating and aerating apparatus, a vessel, agitating means in said vessel, means for operating said agitating means, an inlet into the lower part of said vessel for substance to be treated therein, a plurality of outlets for said substance at various heights in said vessel above said inlet, means for closing each one of said outlets whereby said outlets are adapted to be used alternatively, so that each outlet may be used to the exclusion of use of any other one of the outlets simultaneously, a liquid inlet in said vessel above said inlet for the substance, and a plurality of air inlets at various heights in said vessel above said substance inlet.

8. In beating and aerating apparatus, a vessel, agitating means in said vessel, means for operating said agitating means, an inlet in the lower part of said vessel for substance to be treated therein, an outlet for said substance in a part of said vessel above said inlet, and air inlets at various heights in said vessel.

9. In beating and aerating apparatus, a vessel, agitating means in said vessel, means for operating said agitating means, an inlet in the lower part of said vessel for substance to be treated therein, and a plurality of outlet means for said vessel at various heights thereof above said inlet, whereby said substance may be allowed to escape in its entirety from said vessel through any one of said outlet means, substantially without the loss of any of the constituents of said substance which it had when it entered the vessel.

10. In beating and aerating apparatus, a vessel, agitating means in said vessel, means for operating said agitating means, an inlet in the lower part of said vessel for substance to be treated therein, an outlet for said substance in a part of said vessel above said inlet, and means around said vessel for confining a temperature controlling medium thereto.

11. In beating and aerating apparatus, an upright cylindrical vessel, an upright shaft in the center of said vessel, bearings for said shaft, agitating means rotating with said shaft, means rotatably mounted on said shaft and comprising scrapers bearing against the side of the vessel, means for driving said shaft and scrapers, an inlet for substance to be treated in the lower part of said vessel, and an outlet for the substance in said vessel above the level of said inlet.

12. In beating and aerating apparatus, an upright cylindrical vessel, an upright shaft in the center of said vessel, bearings for said shaft, agitating means rotating with said shaft, means rotatably mounted on said shaft and comprising scrapers bearing against the side of the vessel, means for driving said shaft and scrapers, an inlet for substance to be treated in the lower part of said vessel, and a plurality of outlets for the substance in said vessel at various levels above that of said inlet.

13. In beating and aerating apparatus, an upright cylindrical vessel, an upright shaft in the center of said vessel, bearings for said shaft, agitating means rotating with said shaft, means rotatably mounted on said shaft and comprising scrapers bearing against the side of the vessel, means for driving said shaft and scrapers, an inlet for substance to be treated in the lower part of said vessel, an outlet for the substance in said vessel above the level of said inlet, and a pump connected to said inlet to force the substance into the lower part of the vessel.

EDWARD C. BECHT.

Witnesses:
CLARENCE PERDEW,
HELEN MAIER.